US012596033B2

(12) United States Patent
Sheridan

(10) Patent No.: US 12,596,033 B2
(45) Date of Patent: Apr. 7, 2026

(54) LIGHT SENSOR

(71) Applicant: Nix Sensor Ltd., Hamilton (CA)

(72) Inventor: Matthew Sheridan, Burlington (CA)

(73) Assignee: Nix Sensor Ltd., Hamilton (CA)

( * ) Notice: Subject to any disclaimer, the term of this patent is extended or adjusted under 35 U.S.C. 154(b) by 416 days.

(21) Appl. No.: 18/256,540

(22) PCT Filed: Dec. 7, 2021

(86) PCT No.: PCT/CA2021/051751
§ 371 (c)(1),
(2) Date: Jun. 8, 2023

(87) PCT Pub. No.: WO2022/120471
PCT Pub. Date: Jun. 16, 2022

(65) Prior Publication Data
US 2024/0019303 A1      Jan. 18, 2024

Related U.S. Application Data

(60) Provisional application No. 63/123,257, filed on Dec. 9, 2020.

(51) Int. Cl.
*G01J 3/02*          (2006.01)
*G01J 3/10*          (2006.01)
*G01J 3/50*          (2006.01)

(52) U.S. Cl.
CPC ............... *G01J 3/0291* (2013.01); *G01J 3/10* (2013.01); *G01J 3/501* (2013.01); *G01J 2003/104* (2013.01); *G01J 2003/106* (2013.01)

(58) Field of Classification Search
None
See application file for complete search history.

(56) References Cited

U.S. PATENT DOCUMENTS

| | | | |
|---|---|---|---|
| 6,844,931 B2 | 1/2005 | Ehbets | |
| 8,279,441 B2 | 10/2012 | Brown et al. | |
| 2006/0192963 A1* | 8/2006 | Frick ................... | G01N 21/255 |
| | | | 356/420 |
| 2010/0148083 A1* | 6/2010 | Brown ................. | G01J 3/0291 |
| | | | 356/325 |
| 2017/0115209 A1* | 4/2017 | Sheridan ............... | G01N 33/08 |

OTHER PUBLICATIONS

International Search Report, PCT/CA2021/051751 dated Feb. 9, 2022.

\* cited by examiner

*Primary Examiner* — Shan Liu
(74) *Attorney, Agent, or Firm* — Crowe & Dunlevy, P.C.

(57) ABSTRACT

The apparatus is for use with a surface and includes a light source, a body and a light production apparatus. The light source includes a plurality of elements for generating light. The body: has a planar base for placement in use on the surface, the base being orientated perpendicular to the receiving axis; defines a sampling aperture communicating with the base and through which the receiving axis passes; encompasses the elements; and is adapted, in combination with the light source and when the sampling aperture is blocked to ambient light, to shield the sensor from ambient light. The light production apparatus is for converting the light of the elements through internal reflection, absorption and filtration into light collimated to impinge upon the base, at the intersection of the base and the receiving axis, at a predetermined angle to the receiving axis.

18 Claims, 8 Drawing Sheets

LIGHT SENSOR

FIELD

The invention relates to the field of light sensing.

BACKGROUND

Known spectrophotometers are relatively expensive and bulky.

SUMMARY

Apparatus for use with a surface forms one aspect of the invention. This apparatus comprises a light sensor, a light source, a body and light production apparatus. The sensor has a light receiver, the light receiver defining a receiving axis. The light source includes a plurality of elements for generating light. The body: has a planar base for placement in use on the surface, the base being orientated perpendicular to the receiving axis; defines a sampling aperture communicating with the base and through which the receiving axis passes; encompasses the elements; and is adapted, in combination with the light source and when the sampling aperture is blocked to ambient light, to shield the sensor from ambient light. The light production apparatus is for converting the light of the elements through internal reflection, absorption and filtration into light collimated to impinge upon the base, at the intersection of the base and the receiving axis, at a predetermined angle to the receiving axis.

According to another aspect of the invention, the light production apparatus can comprise an annular waveguide which extends from the elements towards the base.

According to another aspect of the invention, the waveguide can comprise a solid of revolution, the revolved solid extending from the elements towards the base.

According to another aspect of the invention, the waveguide can comprise a portion that is shaped for irradiation by substantially all light produced by the light source.

According to another aspect of the invention, the elements can be arranged in a ring and the portion that is shaped for irradiation by substantially all light produced by the light source can be an annular groove.

According to another aspect of the invention, the waveguide can terminate in an edge that is orientated towards the point at which the receiving axis intersects the base.

According to another aspect of the invention, the body can include, for each element, a ray blocker, the ray blockers being disposed in a ring, in spaced-relation to one another and adjacent the edge and positioned such that, when viewed along the receiving axis, the elements and the ray blockers are disposed in circumferentially alternating relation.

According to another aspect of the invention, the elements and the sensor spectrophotometer can form part of an integrated circuit.

According to another aspect of the invention, the waveguide can define a hollow which receives the sensor in circumferentially spaced relation and the integrated circuit can further comprise a calibration sensor which is directed towards the hollow.

According to another aspect, the sensor can be a spectrophotometer.

According to another aspect, the calibration sensor can be a spectrophotometer.

According to another aspect, the elements can be light emitting diodes.

According to another aspect, the light emitting diodes can include blue light-emitting diodes, violet light-emitting diodes and ultra-violet light-emitting diodes, the blue light-emitting diodes including yellow phosphorous.

According to another aspect, the predetermined angle can be 45°.

According to another aspect, the integrated circuit includes circuitry which provides, in use, for generation by the elements of light that is substantially symmetrical about receiving axis.

According to another aspect, in use, the sensor has a working range and the circuitry, in use, smooths the spectral distribution of the light generated by the elements throughout the working range.

According to another aspect, the elements are selectively illuminated in use by the circuitry.

Advantages, features and characteristics of the invention will become apparent upon review of the following detailed description with reference to the appended drawings.

DESCRIPTION

Figure 1:
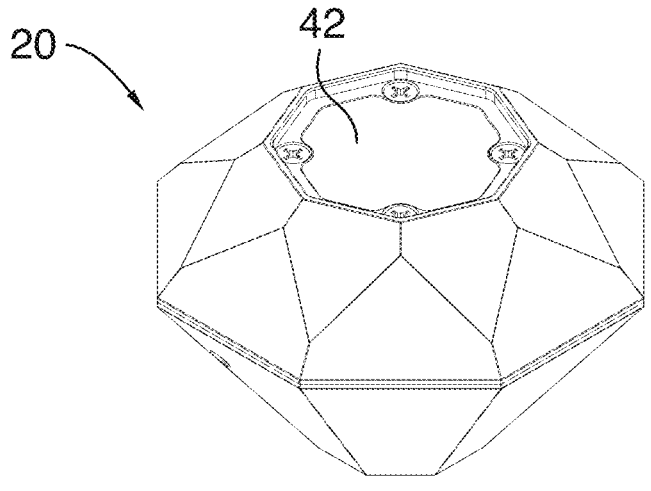
FIG. 1 is a bottom perspective view of an embodiment of the invention.
Figure 2:
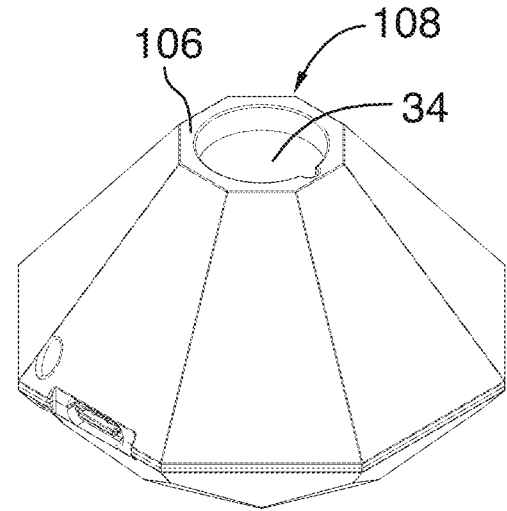
FIG. 2 is a top perspective view of the apparatus of FIG. 1.
Figure 3:
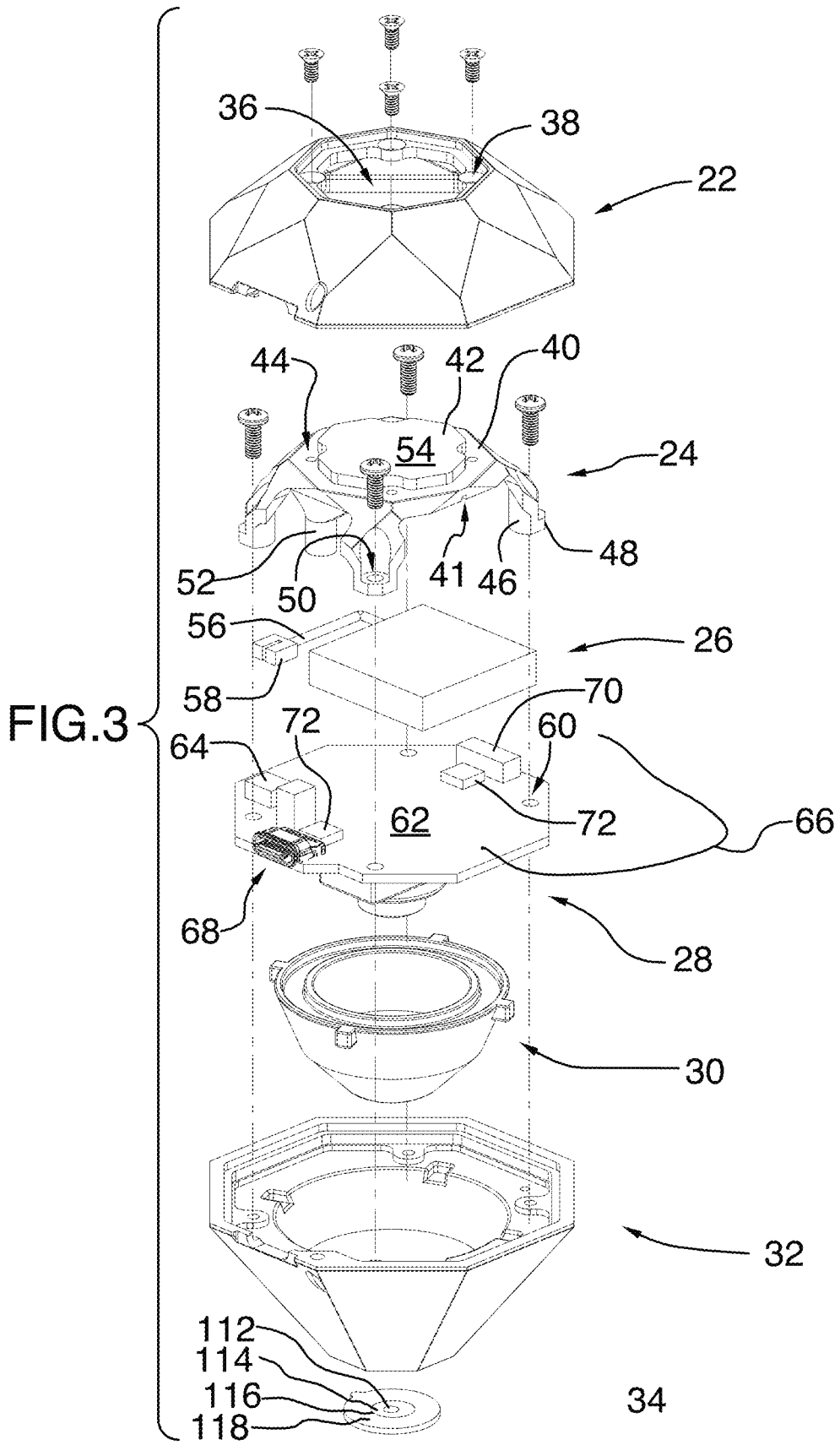
FIG. 3 is an exploded view of the apparatus of FIG. 1.

Apparatus 20 according to a non-limiting embodiment of the invention is shown in FIG. 1 and FIG. 2 and will be understood to include, as best seen in the exploded view of FIG. 3: a top cover 22, a light cap 24, a battery 26, an integrated circuit 28, a light ring 30, a body 32 and a dust cover 34.

The top cover 22 is an anodized aluminum dish defining a central port 36 and a plurality of fastener holes 38.

The light cap 24 is a molded acrylic component having a platform 40, a raised boss 42 protruding from the platform 40, a plurality of fastener bores 44 defined in the platform 40, a plurality of legs 46 depending from the platform 40, each leg 46 terminating in a foot 48 defining a mounting hole 50, and a pair of rods 52 depending from the platform 40. The rods 52 and the platform 40 are transparent. The boss 42 has a shape complementary to the port 36 and a textured surface 54. The cap 24 has a groove 41.

Battery 26 is rectangular and has a lead 56 that terminates in a plug 58.

Figure 4:
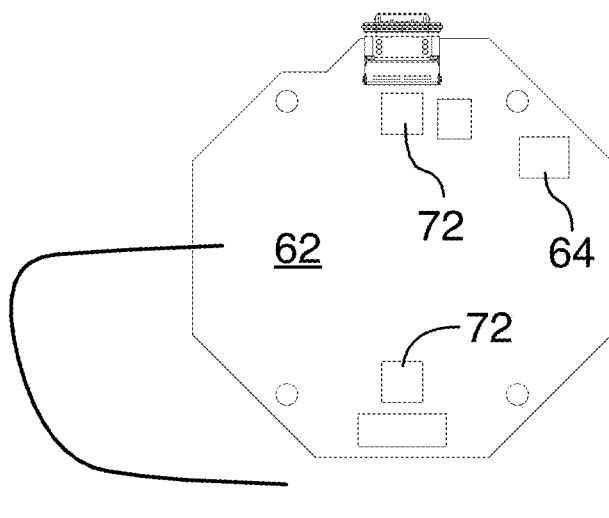
FIG. 4 is a view of structure 28 in FIG. 1.
Figure 5:
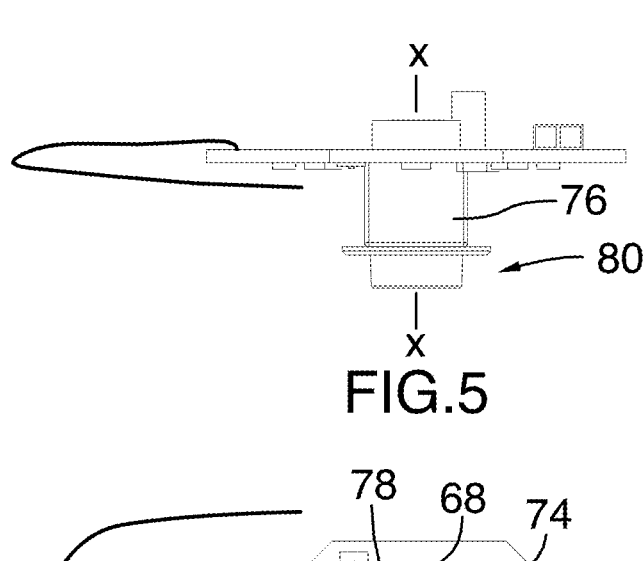
FIG. 5 is a side view of the structure of FIG. 4.
Figure 6:
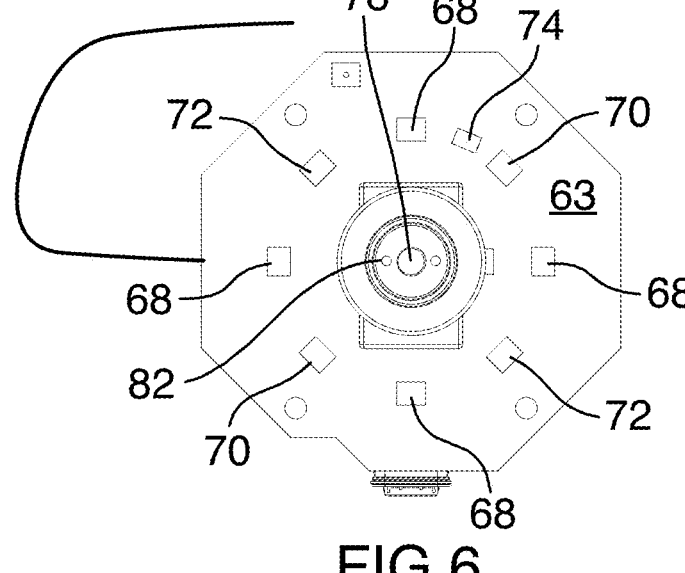
FIG. 6 is a bottom view of the structure of FIG. 4.
Figure 7:
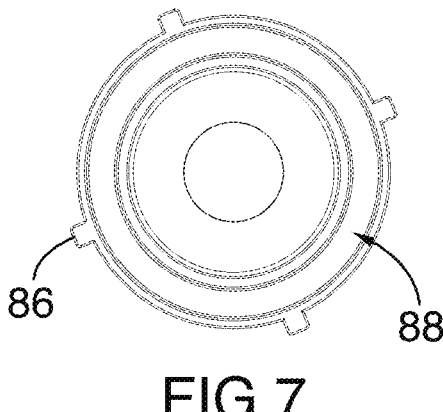
FIG. 7 is a view of structure 30 in FIG. 1.
Figure 8:
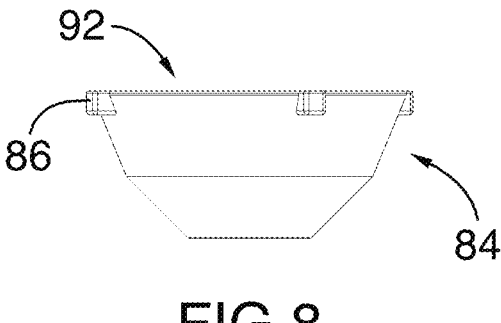
FIG. 8 is a side view of the structure of FIG. 7.
Figure 9:
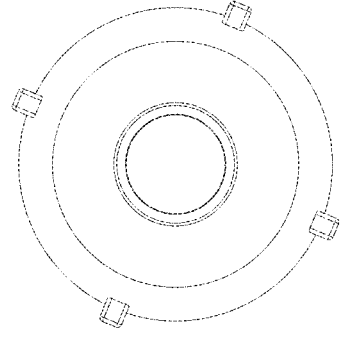
FIG. 9 is a bottom view of the structure of FIG. 7.

Circuit 28 has a plurality of bores 60 defined therethrough and, as best seen in FIG. 4 through FIG. 6, opposed faces 62,63. One face 62 has mounted thereon a socket 64, an antenna 66, a micro-USB port 68, a vibration motor 70 and a pair of LED back lights 72. The other face 63 has mounted thereon a scanning spectrophotometry assembly 66, a plurality of elements 68, 70, 72 and a calibration sensor 74. Circuit 28, by virtue of elements 68,70,72, will be understood to define a light source.

Assembly 66 includes a sensor 76, a light receiver 78 and a mask 80. Sensor 76 is a 128 channel spectrophotometry chip. Mask 80 is cylindrical and has a pair of protruding pins 82. Light receiver 78 defines a receiving axis X-X.

The plurality of elements 68, 70, 72 includes 4 broad spectrum white LEDs 68, 2 violet LEDs 70 and 2 UV LEDs 72. The white LEDs 68 are of the type that include a blue LED and yellow phosphor.

The calibration sensor 74 is a 24 channel spectrophotometer.

The light ring 30 comprises an annular waveguide 84 and a plurality of detents 86. The waveguide 84 is a solid of revolution that, at one end, includes an annular groove 88 and, at the other end, terminates in an edge 90. Detents 86 extend radially from the one end. The waveguide 84 is constructed of plastic and defines a hollow 92.

The body 32 is a 3D printed anodized aluminum component that includes a shroud 94, a sight 96 and a plurality of ray blockers 98.

The shroud 94 defines a central void 100, a plurality of threaded bores 102, a plurality of notches 104, a planar base 106 and a sampling aperture 108 in the base 106.

The sight 96 is a thickwalled tubular element positioned adjacent the base 106, projecting towards the sampling aperture 108 and having a pair of pin receivers 110 defined therein.

The ray blockers 98 extend radially from the sight 96 and rigidly connect the sight 96 to the shroud 94 in spaced relation.

The dust cover 34 is an acrylic disc having a transparent centre 112, a transparent ring 114 disposed in spaced relation to the center and concentric opaque rings 116,118, one 116 separating the transparent ring 114 from the transparent centre 112 and the other 118 ringing the periphery of the disc.

Figure 10:
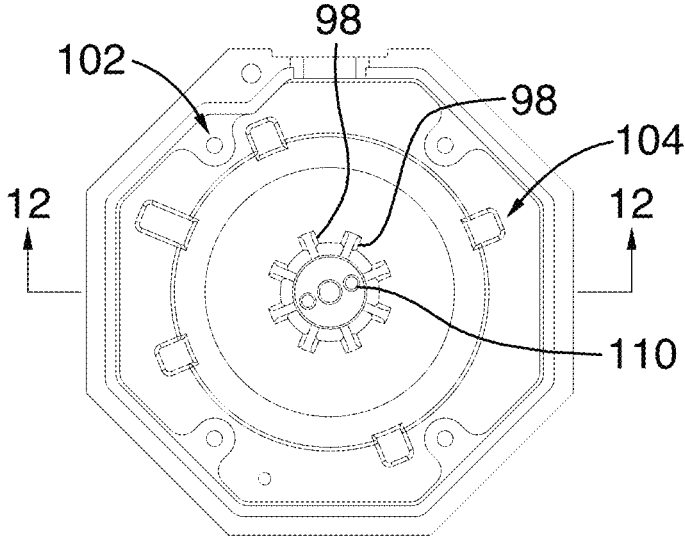
FIG. 10 is a view of structure 32 in FIG. 1.
Figure 11:
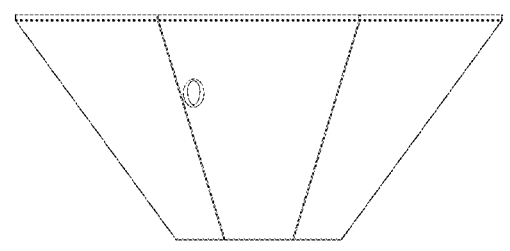
FIG. 11 is a side view of the structure of FIG. 10.
Figure 12:
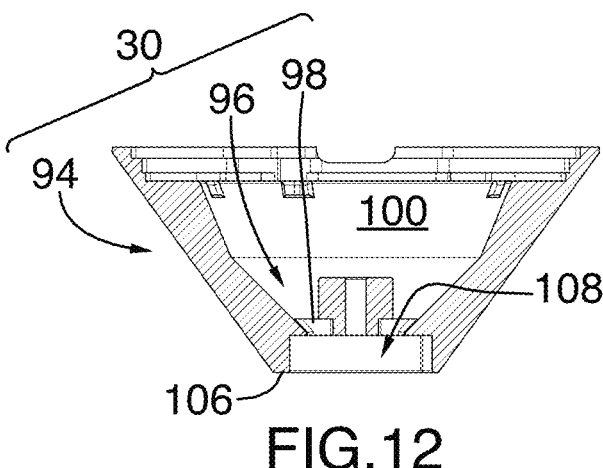
FIG. 12 is a view along section 12-12 of FIG. 10.

For use:
the dust cover 34 is adhesively secured to the body 32 with the transparent centre 112 communicating with the interior of the sight 96;
the light ring 30 is disposed in the central void 100 with the detents 86 disposed in the notches 104
the integrated circuit 28 is disposed upon the light ring 30
the plug 58 of the battery is fitted in socket 64 of the integrated circuit 28;
the battery 26 is disposed upon the integrated circuit 28;
the light cap 24 is disposed upon the integrated circuit 28 in overlying relation to the battery 26, with rods 52 seated upon light elements 72
the light cap 24 is secured to the integrated circuit 28 and the integrated circuit 28 is secured to the body 32 by screws 120 that extend through the mounting holes 50 of the legs 46 and the bores 60 of the integrated circuit 28 into the threaded bores 102 of the shroud 94.
the top cover 22 is disposed upon the light cap 24 with the boss 42 protruding through the port 36
screws 122 pass through the fastener holes 38 in the top cover 22 into the fastener bores 42 of the platform 40
the antenna 66 lies within groove 41
So assembled:
the ray blockers 98 will, as seen in FIG. 10, to be disposed in a ring, in spaced-relation to one another and adjacent the edge 90 and positioned such that, when viewed along the axis X-X, the diodes 68, 70, 72 and the ray blockers 98 are disposed in circumferentially alternating relation;
the hollow 92 is in receipt of the scanning spectrophotometer assembly 66 in circumferentially spaced relation;
the calibration spectrophotometer 74 is disposed within and directed towards the hollow 92;
the base 106 is orientated perpendicular to the receiving axis X-X;
the sampling aperture 108 communicates with the base 106;
the receiving axis X-X passes through the sampling aperture 108; the body 32 encompasses the diodes 68,70,72;
the body 32, in combination with the light source and when the aperture 108 is blocked to ambient light, shields the scanning spectrophotometer 66 from ambient light;
the revolved solid extends from the diodes 68,70,72 towards the base 106;
the groove receives substantially all light produced by the light source;
the edge 90 is orientated towards the point at which the axis X-X intersects the base 106; and
the light cap receives light generated by the back lights and is thereby illuminated.

Figure 13:
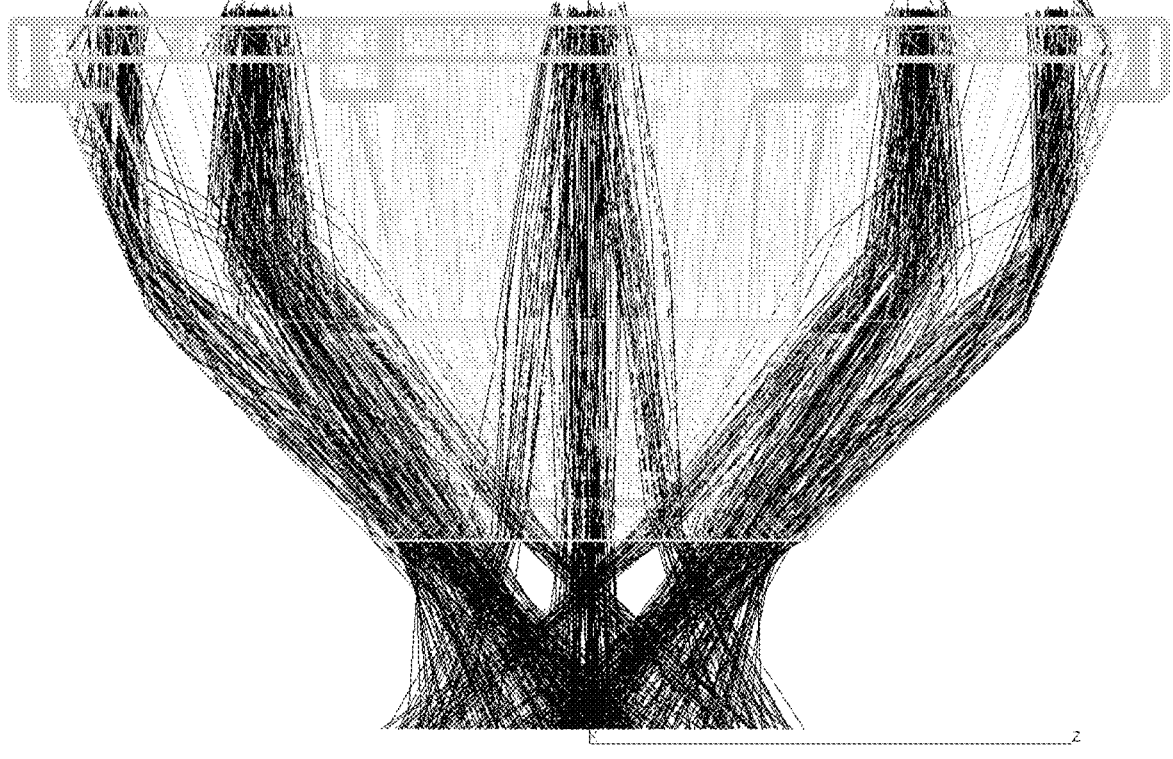
FIG. 13 shows ray tracing of the apparatus.
Figure 14:
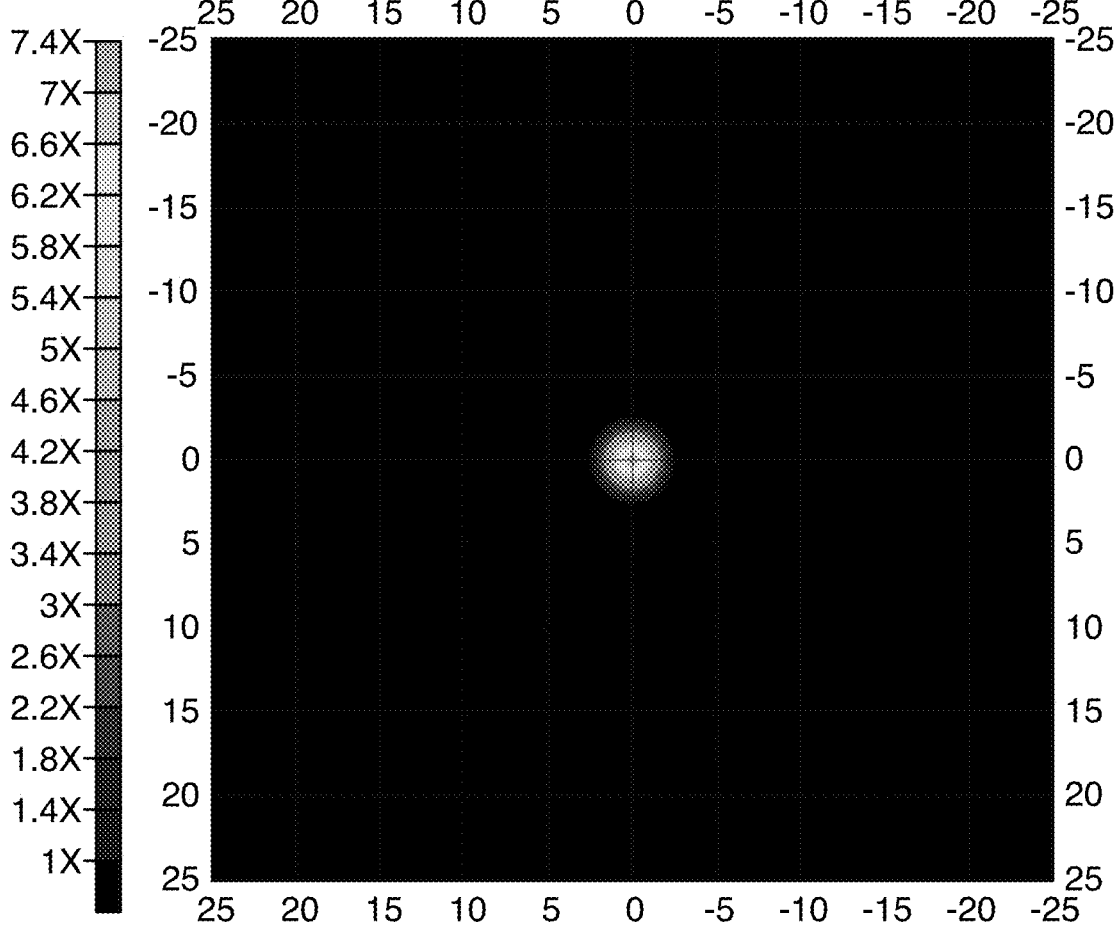
FIG. 14 is an irradiance map of ray trace of FIG. 13.
Figure 15:
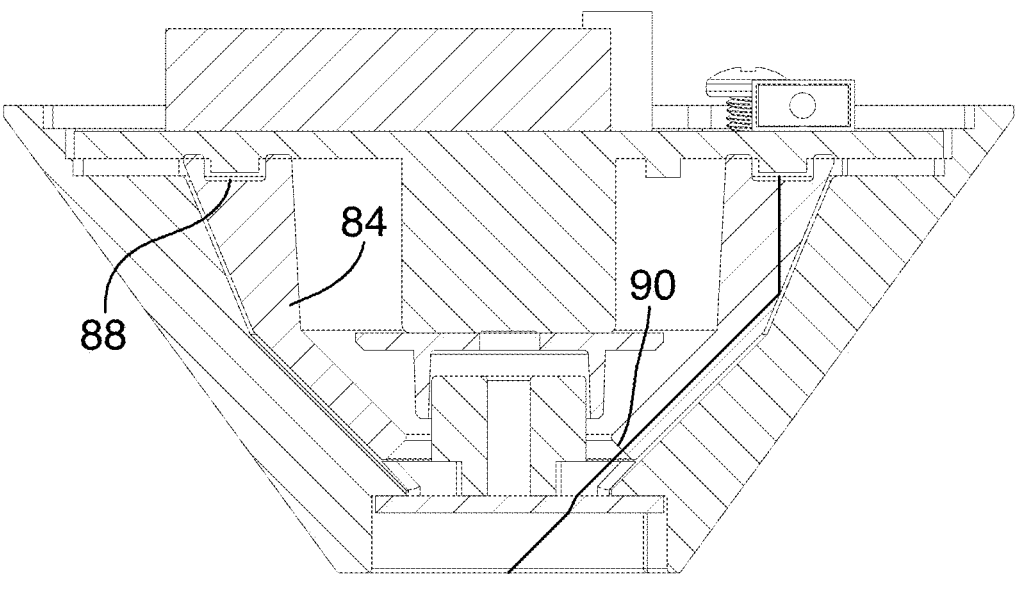
FIG. 15 is a schematic light path.

So structured, the waveguide 84, the shroud 94 and the ray blockers 98 define light production apparatus adapted to converts the light of the diodes 68,70,72 through internal reflection, absorption, refraction and filtration into light collimated to impinge upon the base 106, at the intersection of the base 106 and the receiving axis X-X, at a predetermined angle of 45° to the receiving axis X-X, all as best indicated by:

FIG. 15, a schematic view showing the path of a single ray of light exiting a diode at an angle parallel to the receiving axis; the ray will be seen to enter the waveguide through the channel and be internally reflected so that it reaches the edge at an angle such that, as the ray is refracted at waveguide/air, air/dust-cover and dust-cover/air transitions, the ray impinges the surface at the intersection of the receiving axis and the surface at a 45°;

FIG. 13 is a rendering that shows the result of a simulation in which approximately 70000 rays of light, equally radially spaced, extend from each of the LEDs and impinge upon the base (about 1% of the rays are depicted); and FIG. 14. is an irradiance map of a plane normal to the receiving axis and coplanar with the base, generated from the same ray trace simulation shown in FIG. 13, that demonstrates that a large proportion of the light impinges upon the base at the intersection of the receiving axis and the base.

For use, the apparatus is first tuned, to account for, inter alia, manufacturing variations in the LEDs, to ensure:
light generated by the elements is substantially symmetrical about receiving axis; and
the spectral distribution of the light so generated is smoothed throughout the working range of the sensor.

It will also be appreciated that the apparatus will require calibration, which can be done by placing the apparatus on surfaces having known spectral qualities, i.e. color tiles. Calibration is a matter of routine to persons of ordinary skill in the art and as such, further detail in this regard is neither required nor provided.

Persons of ordinary skill will appreciate that the foregoing has numerous advantages including but not limited to:

simple manufacture the calibration spectrophotometer can be used for automatic calibration associated with LED aging, temperature changes, etc.

the vibration motor allows for haptic feedback the light sources and light cap allow for optical feedback Whereas an embodiment is shown and illustrated, variations will be understood to be possible:

LEDs of differing spectra can be used;

sensors other than spectrophotometers could be used, ie simple color sensors could be used for colorimetry; and the LEDs can be selectively actuated and used in subtractive sensing techniques using Beers law.

Accordingly, the invention should be understood to be limited only by the accompanying claims, purposively construed.

The invention claimed is:

1. An apparatus comprising:

a light source including a plurality of elements for generating light;

a body: having a planar base, the planar base being orientated perpendicular to a receiving axis, defining a sampling aperture communicating with the planar base and through which the receiving axis passes, encompasses the elements, and adapted, in combination with the light source and when the sampling aperture is blocked to ambient light, to shield a sensor from ambient light; and a light manipulation apparatus for manipulating the light of the elements through internal reflection, absorption and filtration into light collimated to impinge upon the planar base, at an intersection of the planar base and the receiving axis, at a predetermined angle to the receiving axis, wherein the light manipulation apparatus includes a waveguide, wherein the body includes, for each of the elements, a respective ray blocker, the ray blockers being disposed in a ring, in a spaced-relation to one another, and adjacent to an edge of the waveguide, wherein, from a point of view along the receiving axis, the elements and the ray blockers are disposed in circumferentially alternating relation.

2. The apparatus according to claim 1, wherein the waveguide comprises an annular waveguide which extends from the elements towards the planar base.

3. The apparatus according to claim 2, wherein the waveguide comprises a solid of revolution, the solid of revolution extending from the elements towards the planar base.

4. The apparatus according to claim 2, wherein the waveguide comprises a portion that is shaped for irradiation by substantially all of the light produced by the light source.

5. The apparatus according to claim 4, wherein the elements are arranged in a ring and the portion that is shaped for irradiation by substantially all of the light produced by the light source is an annular groove.

6. The apparatus according to claim 2, wherein the waveguide terminates in the edge that is orientated towards the intersection of the planar base and the receiving axis.

7. The apparatus according to claim 1, wherein the elements are light emitting diodes.

8. The apparatus according to claim 7, wherein the light emitting diodes include blue light-emitting diodes, violet light-emitting diodes and ultra-violet light-emitting diodes, the blue light-emitting diodes including yellow phosphorous.

9. The apparatus according to claim 1, wherein the predetermined angle is 45°.

10. The apparatus according to claim 1, wherein the planar base is for placement in use on a surface.

11. The apparatus according to claim 1, further comprising the sensor.

12. The apparatus according to claim 11, wherein the elements and the sensor form part of an integrated circuit.

13. The apparatus according to claim 12, wherein the waveguide defines a hollow which receives the sensor in circumferentially spaced relation and the integrated circuit further comprises a calibration sensor which is directed towards the hollow.

14. The apparatus according to claim 13, wherein the calibration sensor is a spectrophotometer.

15. The apparatus according to claim 12, wherein the integrated circuit includes circuitry which is configured to control generation by the elements of the light to be substantially symmetrical about the receiving axis.

16. The apparatus according to claim 15, wherein the sensor has a working range and the circuitry is configured to smooth spectral distribution of the light generated by the elements throughout the working range.

17. The apparatus according to claim 15, wherein the circuitry is configured to selectively illuminate the elements.

18. The apparatus according to claim 11, wherein the sensor is a spectrophotometer.

* * * * *